(12) United States Patent
Luber et al.

(10) Patent No.: US 9,784,608 B2
(45) Date of Patent: Oct. 10, 2017

(54) METHOD FOR DETECTING A FILL LEVEL IN A COLLECTING VESSEL

(71) Applicant: Pepperl+Fuchs GmbH, Mannheim (DE)

(72) Inventors: Ernst Luber, Neukirchen, DE (US); Claudia Sertl, Neukirchen (DE)

(73) Assignee: Pepperl & Fuchs GmbH, Mannheim (DE)

( * ) Notice: Subject to any disclaimer, the term of this patent is extended or adjusted under 35 U.S.C. 154(b) by 0 days.

(21) Appl. No.: 14/915,679

(22) PCT Filed: Aug. 15, 2014

(86) PCT No.: PCT/EP2014/067490
§ 371 (c)(1),
(2) Date: Mar. 1, 2016

(87) PCT Pub. No.: WO2015/032606
PCT Pub. Date: Mar. 12, 2015

(65) Prior Publication Data
US 2016/0327423 A1    Nov. 10, 2016

(30) Foreign Application Priority Data

Sep. 3, 2013 (DE) .......... 10 2013 109 606

(51) Int. Cl.
*G01F 23/296* (2006.01)
(52) U.S. Cl.
CPC .................. *G01F 23/296* (2013.01)
(58) Field of Classification Search
CPC .................................. G01F 23/296
See application file for complete search history.

(56) References Cited

U.S. PATENT DOCUMENTS 3,985,030 A    10/1976    Charlton
4,905,208 A    2/1990    Dick
(Continued)

FOREIGN PATENT DOCUMENTS

DE    35 13 270 A1    10/1986
DE    43 08 373 A1    9/1994
(Continued)

OTHER PUBLICATIONS

Verdad, G. E. F. and Méndez, J. A. D. 1999. Adaptive Filters. Wiley Encyclopedia of Electrical and Electronics Engineering.*
(Continued)

*Primary Examiner* — Lisa Caputo
*Assistant Examiner* — Punam Roy
(74) *Attorney, Agent, or Firm* — Collard & Roe, P.C.

(57) ABSTRACT

A method for detecting a fill level in a collecting vessel using a sensor device, wherein the collecting vessel has m detection regions which are measured using ultrasound, includes the following steps: 1. a measurement cycle is performed for each of the m detection regions, where m= 1, 2, 3, . . . ; 2. n individual measurements are performed in each measurement cycle, where n= 1, 2, 3, . . . , wherein a transmission power and/or a reception gain and/or a transmission burst is varied in each of the n individual measurements, as a result of which the individual measurements are distinguished from one another in terms of the transmission power and/or in terms of the reception gain and/or in terms of the transmission burst.

9 Claims, 3 Drawing Sheets

(56) References Cited

U.S. PATENT DOCUMENTS

Figure 1:
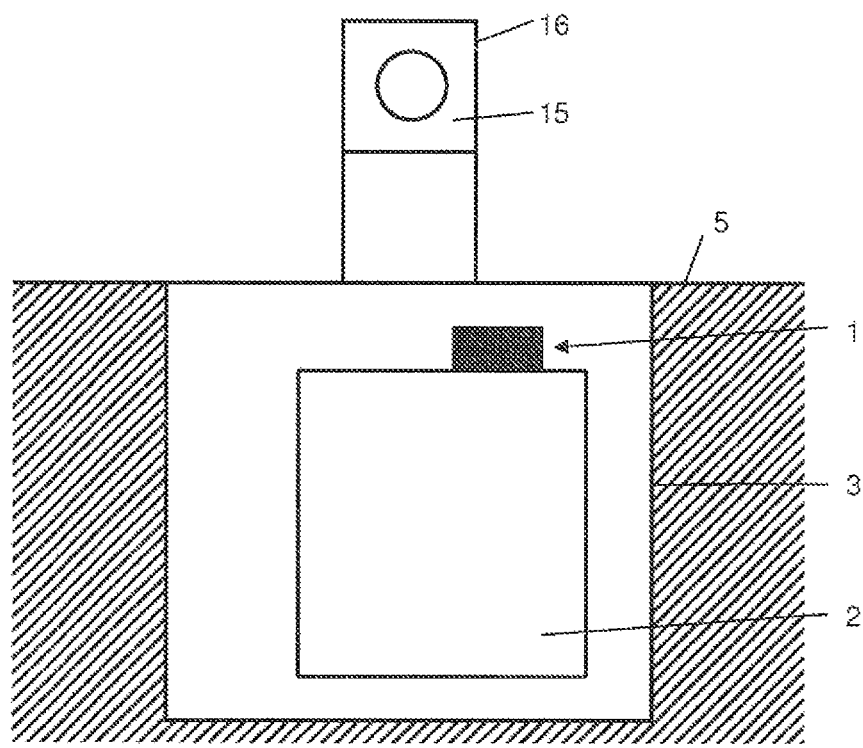

| | | | |
|---|---|---|---|
| 4,914,951 A | | 4/1990 | Koelpin et al. |
| 5,038,611 A | * | 8/1991 | Weldon ............... G01F 23/2962 377/25 |
| 5,163,323 A | * | 11/1992 | Davidson ............ G01F 23/2962 702/159 |
| 5,185,126 A | * | 2/1993 | Adamski ................ A61L 11/00 219/421 |
| 5,587,969 A | | 12/1996 | Kroemer et al. |
| 6,573,732 B1 | * | 6/2003 | Reimer ................ B60K 15/077 324/644 |
| 7,046,189 B2 | | 5/2006 | Spanke et al. |
| 7,131,325 B2 | * | 11/2006 | Nilsson ................. G01F 23/284 73/290 R |
| 7,243,539 B2 | * | 7/2007 | Otto ...................... G01F 23/284 340/621 |
| 7,460,057 B2 | | 12/2008 | Fehrenbach et al. |
| 2006/0015292 A1 | | 1/2006 | Lubcke |
| 2006/0037392 A1 | * | 2/2006 | Carkner ............. G01F 23/2962 73/290 V |
| 2007/0261486 A1 | | 11/2007 | Fallet |
| 2007/0261487 A1 | | 11/2007 | Sintes et al. |
| 2013/0302655 A1 | * | 11/2013 | Deveau ............... H01M 10/484 429/50 |

FOREIGN PATENT DOCUMENTS

| | | |
|---|---|---|
| DE | 101 49 851 A1 | 4/2003 |
| DE | 102 60 962 A1 | 7/2004 |
| DE | 10 2005 057 094 A1 | 6/2007 |
| EP | 0 320 695 A1 | 6/1989 |
| EP | 0 780 665 A2 | 6/1997 |
| EP | 2 148 219 B1 | 1/2010 |
| WO | 03/054481 A2 | 7/2003 |
| WO | 2006/072160 A1 | 7/2006 |

OTHER PUBLICATIONS

Paulo, SR Diniz. "Adaptive filtering algorithms and practical implementation." The international series in Engineering and Computer Scienc (2013).*

International Preliminary Report on Patentability and Written Opinion of the International Searching Authority in PCT/EP2014/067490, dated Mar. 17, 2016.

International Search Report of PCT/EP2014/067490, dated Oct. 13, 2014.

* cited by examiner

METHOD FOR DETECTING A FILL LEVEL IN A COLLECTING VESSEL

CROSS REFERENCE TO RELATED APPLICATIONS

This application is the National Stage of PCT/EP2014/067490 filed on Aug. 15, 2014, which claims priority under 35 U.S.C. §119 of German Application No. 10 2013 109 606.9 filed on Sep. 3, 2013, the disclosure of which is incorporated by reference. The international application under PCT article 21(2) was not published in English.

The invention relates to a method for detection of a fill level in a collection container.

Specific physical, chemical properties or material compositions of an environment can be detected with a sensor device, so that it is possible to also measure a fill level in a collection container, for example the fill level in a waste container. In this measurement method for detection of the fill level in the collection container, an ultrasound transducer disposed in the sensor device emits signals that are reflected as echo signals by the content or by the bottom of the collection container. The distance between the ultrasound transducer and the content or the distance between the ultrasound transducer and the bottom of the collection container is determined by way of the echo signals. Thus, distance values are obtained from these echo signals, from which values the fill level in the collection container can be determined.

Such a method for fill level detection is described, for example, in EP 2 148 219 B1.

In DE 4308373 A1, a method for detection and for separation of useful echoes and interference echoes in the reception signal of distance sensors is described. These distance sensors work according to the pulse/echo principle. In this regard, a single echo is assigned to a maximum detected in a reception signal, wherein characteristic echo features are determined for the individual echo, in terms of value, from the reception signal. In a subsequent evaluation, these echo characteristics are linked with one another in such a manner that a multiple echo probability is assigned to each individual echo.

In DE 4308373 A1, however, the intensity of the signals emitted as well as the transmission power remain constant in the measurements, and this can lead to significant losses in the near range.

A sensor for measuring a liquid level in a container by means of ultrasound is known from US 2007/0261487 A1. In this regard, the transmission power is defined using echo signals. In addition, the attenuation is established as a function of the distance. Influence variables such as relative humidity or temperature, for example, are not taken into consideration in control of the transmission power.

It is therefore the task of the present invention to make available a method for the detection of a fill level in a collection container, with which method distance measurements can be carried out both in the near range and in the far range, and undesirable interference signals can be suppressed.

This task is accomplished according to the characteristics of the invention.

The invention therefore relates to a method for detection of a fill level in a collection container by means of a sensor device, wherein the sensor device is configured as an ultrasound sensor. In this method, the different regions (detection regions) of the collection container, which regions are to be measured, are measured by means of ultrasound. For this purpose, the method provides a measurement sequence that comprises at least one measurement cycle. A detection region is measured with each measurement cycle. If, therefore, m detection regions are to be measured, then m measurement cycles are accordingly required. Each of these m measurement cycles consists of n individual measurements (with n=1, 2, 3 . . . ), wherein a specific detection region of an interior of the collection container is measured with each measurement cycle. In that the transmission power and/or the reception gain and/or the transmission burst is adapted in the n individual measurements, it is possible to mask out undesirable interference signals. The individual measurements therefore differ from one another by at least one of the three variables (transmission power or reception gain or transmission burst).

A further advantage of the method consists in that fewer detection regions have to be measured by means of varying the transmission power and/or the reception gain and/or the transmission burst, and thereby fewer measurement cycles and therefore fewer individual measurements are required to determine the fill level of the collection container. In this regard, initialization takes place before the beginning of a measurement sequence. By means of this initialization, the sensor device is calibrated with reference to a specific collection container type that corresponds to the type of collection container that is to be measured. For this purpose, a previously produced profile for a specific collection container type is uploaded from the data memory module, which profile was created as a function of the respective collection container type as well as its container dimensions. During the creation of this profile, the limit values for the fill level of the collection container type are defined, wherein the minimal fill level (=collection container is empty) is entered as the lower limit value, and the maximal fill level (=collection container is full) is entered as the upper limit value. Other general conditions also flow into the profile, such as, for example, the relative humidity or the outdoor temperature. Furthermore, different transmission powers, receptions gains, as well as detection limits, i.e. the sensitivity of the ultrasound transducer, are included in the profile. This initialization takes place only once for a specific collection container type. After the initialization was performed, the actual measurement sequence can be started.

It is furthermore advantageous that a plausibility check is performed for each of the m measurement cycles (with m=1, 2, 3, . . . ). In this regard, a check takes place to determine whether the individual measurements of the different measurement cycles have led to measurement results that can be evaluated. In other words, a check takes place to determine whether the measurement values obtained by means of the measurement cycles are valid and therefore can be evaluated. Measurement values that cannot be evaluated are filtered out with this plausibility check, so that only the measurement values that can be evaluated are used for the further evaluation. In this way, incorrect measurements can be recognized right from the start, so that measurement values obtained from incorrect measurements are not used for a determination of the distance of the ultrasound transducer from the content of the collection container or for a determination of the distance of the ultrasound transducer from the bottom of the container. As a result, the distance values can be determined very precisely, and therefore the fill level can also be determined very precisely.

It is furthermore advantageous that the measurement values that can be evaluated are averaged by means of adaptive filtering, and the distance values obtained by averaging are checked with regard to their stability. As a result of the stability check, only distance values that can be evaluated are used for the calculation of the fill level. In contrast, distance values that cannot be evaluated are not included in the calculation of the fill level. In this way, it is possible to determine the fill level of the collection container with very little computation effort, and furthermore very precisely.

It is advantageous if the distance values determined are transmitted to an external higher-level controller by way of a bidirectional serial interface, wherein the higher-level controller calculates the fill level of the collection container from the distance values obtained by averaging of the measurement values. A diagnosis is performed in the external higher-level controller for the invalid distance values. This diagnosis helps to optimize the method for fill level determination.

Figure 2:
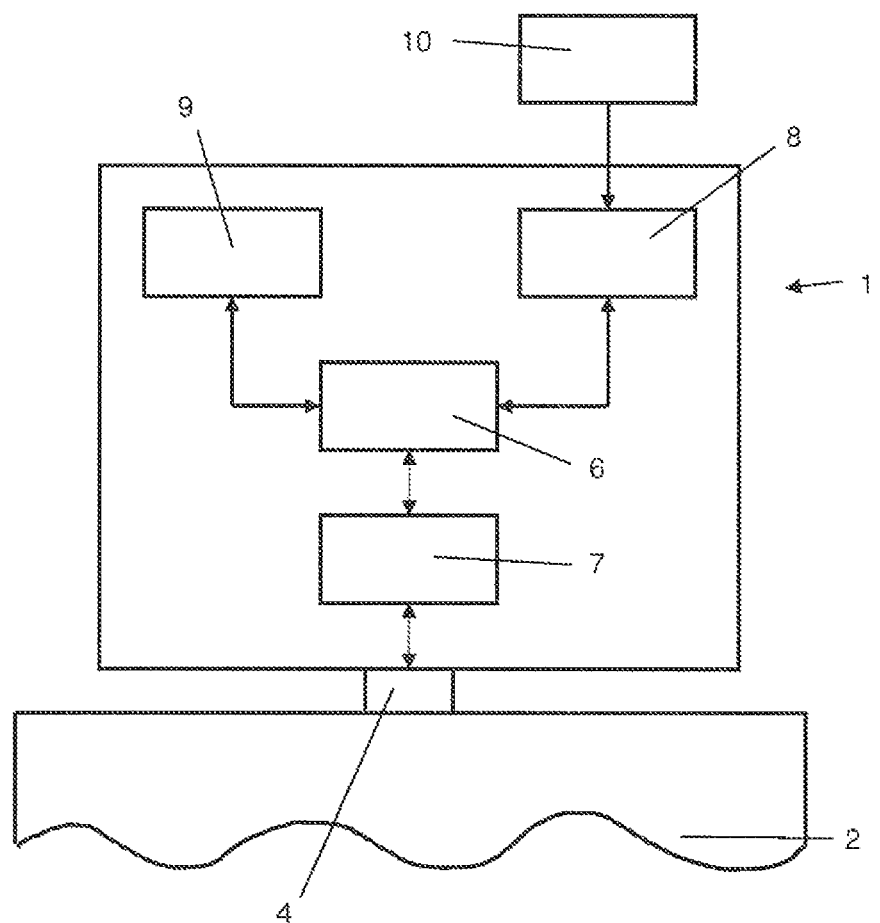

In the following, an exemplary embodiment will be shown using figures and explained in greater detail. The figures show:

FIG. 1 a sensor device for fill level detection in a collection container;

FIG. 2 a schematic structure of the sensor device shown in FIG. 1, and

Figure 3:
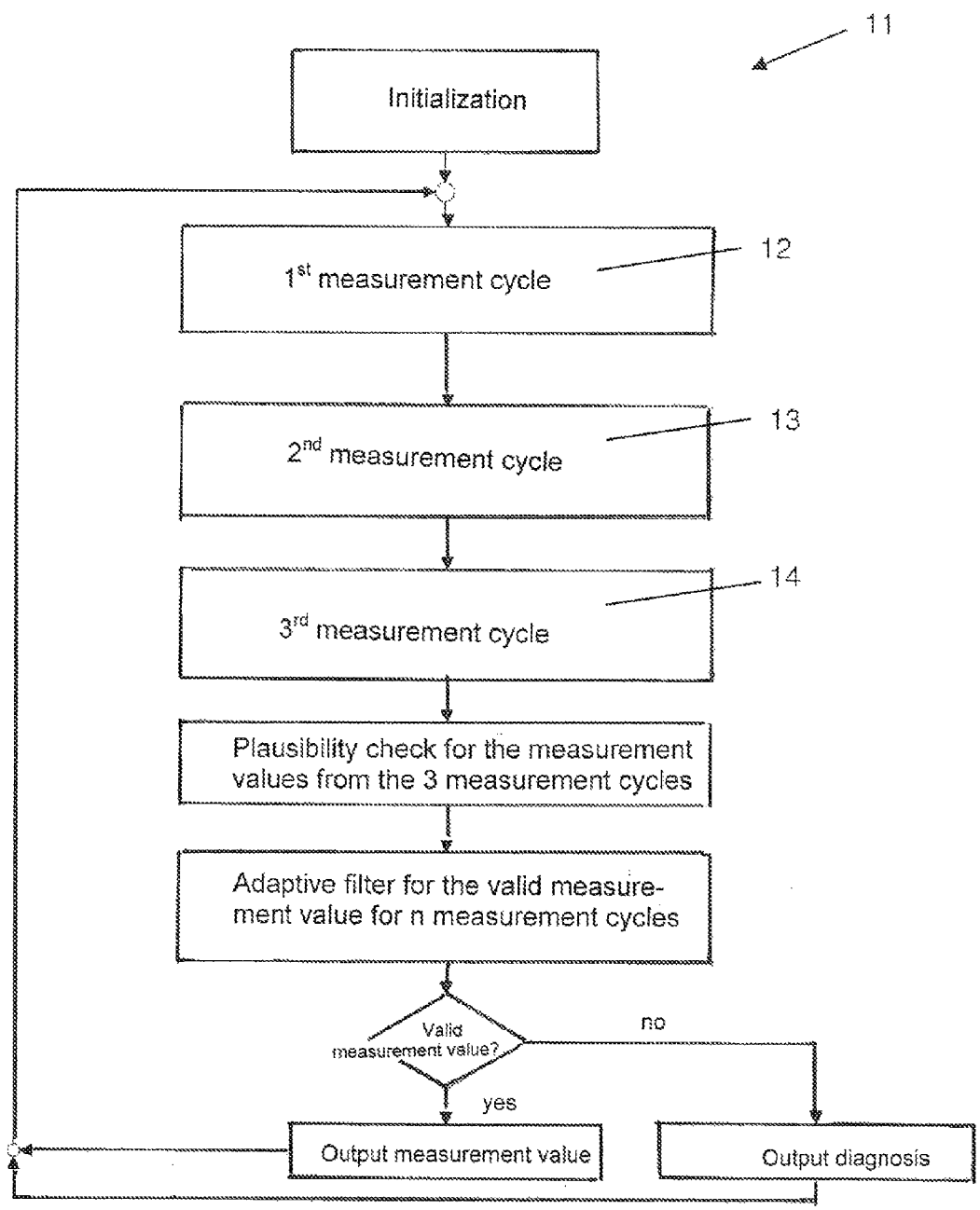

FIG. 3 a schematic representation of a measurement sequence.

In FIG. 1, a sensor device 1 for fill level detection in a collection container 2 is shown. This collection container 2—as shown in FIG. 1—can be an underfloor container 2. This underfloor container 2 is housed in a chamber 3, which can be part of a building (not shown). The chamber 3, in which the underfloor container 2 is housed, lies underneath a bottom 5. A filling shaft 16 having a filling cover 15 projects out of the bottom 5. It is possible to charge the underfloor container 2 by way of the filling shaft 16. If the underfloor container 2 is a waste container, for example, this underfloor container 2 can be charged with waste by way of the filling shaft 16.

The sensor device 1 comprises an ultrasound transducer (not shown), with which the distance between the ultrasound transducer and the content of the collection container 2 (collection container is filled) or the distance between the ultrasound transducer and a bottom of the collection container 2 (collection container is empty in this region) can be determined. Using the ultrasound transducer, different regions (called detection regions) of an interior of the collection container 2 are measured one after the other, in terms of time.

Preferably, the ultrasound transducer is configured in such a manner that this ultrasound transducer can switch between an active operating state and a power-saving mode. If the filling cover 15 of the filling shaft 16 is closed, the ultrasound transducer is in the power-saving mode. In this power-saving mode, the ultrasound transducer uses less energy than in the operating state. If the filling cover 15 of the filling shaft 16 is opened, the ultrasound transducer is switched to the active operating state, and the ultrasound transducer begins with the measurement method in the form of a measurement sequence. In this regard, the ultrasound transducer carries out a measurement cycle for a defined number of regions (detection regions) to be measured, in each instance. Each measurement cycle consists of multiple individual measurements. In order for the ultrasound transducer to start with the measurement sequence, this ultrasound transducer must first be switched from the idle state to the active operating state. For this purpose, an activation device (not shown) is provided, which switches the ultrasound transducer to the active operating state—as a result of external environmental influences, for example. For this purpose, the activation device can have a sensor, for example a light sensor, a movement sensor, a temperature sensor, an electrical contact or a vibration measurement device, which perceives such external environmental influences.

In this regard, activation of the activation device takes place by way of a triggering apparatus, for example the filling cover 15. If, for example, the filling cover 15 is opened, light falls into the interior of the filling shaft 16, and the incident light can be registered by the light sensor. Also, it is possible that the vibration measurement device is excited when the filling cover 15 is opened. It is also possible, however, that the activation device has a time-recording system, thereby causing the ultrasound transducer to perform the measurement sequences at previously defined time intervals.

If the activation device was activated, the activation device transmits a signal to the sensor device 1, thereby causing the sensor device 1 and thereby also the ultrasound transducer to be switched to the active operating state and to perform a measurement sequence.

A schematic structure of the sensor device 1 shown in FIG. 1 is shown in FIG. 2. The sensor device 1 has an ultrasound transducer 4, with which the distance between the ultrasound transducer 4 and the content of the collection container 2 or the distance between the ultrasound transducer 4 and a bottom of the collection container 2 can be measured. Using the ultrasound transducer 4, different regions (detection regions) of an interior of the collection container 2 are measured one after the other, in terms of time.

The sensor device 1 furthermore comprises a control module 6, a transmission/reception module 7, a bidirectional serial interface 8, and a data memory module 9. Although not shown in FIG. 1, the transmission/reception module 7, the bidirectional serial interface 8, and the data memory module 9 can also be a component of the control module 6. The control module 6 preferably has a microcontroller with integrated analog functions as the control element, as well as a power source by way of which the transmission power is controlled, as well as a programmable amplifier, by way of which the reception gain is controlled.

An external higher-level controller 10 is provided outside of the sensor device 1, which controller can have a local fill level display. This local fill level display can be a monitor. The fill level of the collection container 2 that is determined can be monitored using the external controller 10. Furthermore, a diagnosis of the sensor device 1 can be carried out using the external controller 10, for example if distance values were determined that cannot be used for the determination of the fill level, for example because they are incorrect. The external controller 10 receives the diagnosis values required for carrying out the diagnosis from the bidirectional serial interface 8. In this regard, the external controller 10 can be a local signaling apparatus or a remote-action module.

The external controller 10 stands in connection with the bidirectional serial interface 8 of the sensor device 1. This bidirectional serial interface 8 in turn is connected with the control module 6.

If the fill level of the collection container 2 is supposed to be determined, initialization, by means of which the sensor device 1 is calibrated with reference to a specific collection container type, takes place in a first step. For this purpose, a specific profile that is stored in the data memory module 9 is uploaded by the bidirectional serial interface 8 and placed into the control module 6. These profiles serve for calibration of the sensor device 1, wherein the profiles are assigned to a specific collection container type. Because the profiles are assigned to a specific collection container type, the calibration therefore takes place as a function of the container dimensions of a specific collection container type. In this way, it is also possible to define a reference variable for the fill level. For this purpose, limit values for the fill level of a specific collection container type are defined before the start of the measurement sequence, wherein the minimal fill level (=the collection container is empty) is input as the lower limit value, and the maximal fill level the collection container is full) is input as the upper limit value. Furthermore, different transmission powers, reception gains, as well as detection limits, i.e. the sensitivity of the ultrasound transducer 4, are stored in the data memory module 9, so that when a profile is compiled for a specific collection container type, these parameters are also taken into consideration. It is advantageous if other general conditions are also included for the initialization, such as, for example, relative humidity or temperature. The transmission power, the reception gain, and also the transmission burst can be configured using the transmission/reception module 7, which is disposed between the control module 6 and the ultrasound transducer 4.

After the initialization, the actual measurement sequence, which consists of multiple measurement cycles, takes place. Each of these measurement cycles in turn consists of multiple individual measurements. In each individual measurement, the distance between the ultrasound transducer 4 and the content of the collection container 2 or the distance between the ultrasound transducer 4 and the bottom of the collection container 2 is measured. The number of measurement cycles in the measurement sequence depends, for example, on the size or on the structure of the collection container to be measured. The larger the collection container and the more complex the structure of the collection container, the more measurement cycles are required.

FIG. 3 shows a schematic representation of a measurement sequence 11 in the form of a flow chart. Before the fill level of a collection container of a specific collection container type is determined, an initialization of the sensor device with reference to this collection container type takes place in a first step. In this regard, this initialization is carried out in the control module 6 (see FIG. 2). By means of this initialization, the sensor device 1 is configured with reference to this specific collection container type. For this purpose, a previously produced profile is uploaded from the data memory module 9 (see FIG. 2), which profile was created as a function of the collection container type and therefore also as a function of its container dimensions. In the creation of this profile, the limit values for the fill level of a specific collection container type are defined, wherein the minimal fill level (=the collection container is empty) is input as the lower limit value, and the maximal fill level (=the collection container is full) is input as the upper limit value. Other general conditions also flow into the creation of the profile, such as, for example, the relative humidity or the outdoor temperature. Furthermore, different transmission powers, reception gains, as well as detection limits, i.e. the sensitivity of the ultrasound transducer, are stored in the profile. This initialization takes place only once for the collection container, the fill level of which is to be determined. After the initialization, the actual measurement sequence 11 begins.

Each measurement sequence contains m measurement cycles, wherein a region of a content of the collection container (=detection region) is measured during each measurement cycle. If, therefore, m detection regions are supposed to be measured (with m=1, 2, 3, . . . ), m measurement cycles are also required for this. Each measurement cycle consists of multiple individual measurements, wherein the distance between the ultrasound transducer and the content of the collection container or the distance between the ultrasound transducer and the bottom of the collection container is detected with each individual measurement, for a specific detection region, in the form of measurement values. In each of the n individual measurements, the transmission power and/or the reception gain and/or the transmission burst are varied, in this regard. The measurement sequence 11 according to FIG. 3 consists of three measurement cycles 12 to 14, wherein each measurement cycle 12 to 14 comprises n individual measurements (with n=1, 2, 3, . . . ). Although the measurement sequence 11 shown in FIG. 3 contains only three measurement cycles 12 to 14, it is clear that a measurement sequence can also have more than three measurement cycles, but must have at least one measurement cycle. In each of these m individual measurements of each measurement cycle 12 to 14, the ultrasound transducer emits an ultrasound signal that is reflected in an interior of the collection container, wherein the reflected signal is received by the ultrasound transducer once again as an echo signal. The echo signal is converted to an electrical signal by the ultrasound transducer 4, and passed on to the control module 6 by way of the transmission/reception module 7 (see also FIG. 2 in this regard).

The electrical signal contains data about the amplitude as well as the running time of the echo signal. This electrical signal correlates with the distance between the ultrasound transducer and the content of the collection container or the distance between the ultrasound transducer and a bottom of the collection container, and is stored in the control module 6 as a measurement value (see FIG. 2). In each of the n individual measurements, a transmission power and/or a reception gain and/or a transmission burst are varied. As a result of varying the transmission power and/or the reception gain and/or the transmission burst, fewer detection regions have to be measured, and therefore fewer measurement cycles and thereby also fewer individual measurements are required to determine the fill level of the collection container.

With the first measurement cycle 12, the distance between the ultrasound transducer and the content of the collection container or the distance between the ultrasound transducer and the bottom of the collection container is determined for a first detection region. This measurement cycle 12 consists of multiple individual measurements, wherein the transmission power and/or the reception gain and/or the transmission burst are varied in each individual measurement. The individual measurements therefore differ from one another in at least one of the three variables (transmission power or reception gain or transmission burst). Thus, a measurement value that corresponds to a distance between the ultrasound transducer and the content of the collection container or the distance between the ultrasound transducer and the bottom of the collection container is obtained from each of the individual measurements. If the measurement cycle 12 therefore comprises n individual measurements (with n= 1, 2, 3, . . . ), m measurement values are also obtained. These n individual measurements of the first measurement cycle 12 are carried out at a weak transmission power as well as at a weak reception gain, so that the first measurement cycle 12 is optimized for short measurement distances and strong interference reflections.

With the second measurement cycle 13, a second detection region is measured. In this regard, the second measurement cycle 13 once again comprises n individual measurements (with n=1, 2, 3, . . . ), wherein the transmission power and/or the reception gain and/or the transmission burst is varied in each individual measurement. In this measurement cycle 13, as well, the individual measurements therefore differ from one another in at least one of the three variables (transmission power or reception gain or transmission burst). The individual measurements of the second measurement cycle 13 are carried out at a medium transmission power as well as at medium interference reflections, so that the second measurement cycle 13 is optimized for medium measurement distances and medium interference reflections. Once the measurement cycle 13 has been concluded, a measurement value is obtained for each of the n individual measurements, in total, therefore, once again, n measurement values.

The third measurement cycle 14 is optimized for large measurement distances and slight interference reflections. This third measurement cycle 14 also consists of n individual measurements (n=1, 2, 3, . . . ), with which a third detection region is measured. In each of the n individual measurements, the transmission power and/or the reception gain and/or the transmission burst are varied, so that the individual measurements differ from one another in at least one of the three variables (transmission power and/or reception gain and/or transmission burst) in this measurement cycle 14, as well. Once the third measurement cycle 14 is concluded, n measurement values that are to be evaluated have been obtained.

All of the measurement values determined by means of the three measurement cycles 12 to 14 are transmitted to the control module. A plausibility check takes place in the control module for all the measurement values determined. In this plausibility check, a check takes place to determine whether the individual measurements of the different measurement cycles have led to results that can be evaluated. In other words, a check takes place to determine whether the measurement values obtained from the measurement cycles are valid and therefore can be evaluated. Measurement values that cannot be evaluated are filtered out with this plausibility check, so that only the measurement values that can be evaluated are used for the further evaluation.

The plausibility check therefore has the advantage that incorrect measurements are recognized right from the start, so that the measurement values obtained from these incorrect measurements are not used for a determination of the distance of the ultrasound transducer from the content of the collection container or of the distance of the ultrasound transducer from the bottom of the collection container. In this way, it is possible to determine the distance very precisely.

Subsequently, adaptive filtering of the measurement values for the distance between the ultrasound transducer and the content of the collection container or the distance between the ultrasound transducer and the bottom of the collection container takes plaice in the control module, for all three measurement cycles 12 to 14. In this regard, the measurement values are averaged for each measurement cycle 12 to 14, in the adaptive filtering, and checked with regard to their stability. Thereby, three distance values are obtained by averaging of the measurement values for each of the three measurement cycles 12 to 14. By means of checking the stability of these three distance values for the three measurement cycles 12 to 14 obtained by means of averaging, a check takes place to determine whether these average measurement values are valid distance values, which can therefore be evaluated, and on the basis of which the fill level of the collection container can be determined. If an invalid distance value is obtained, on the basis of which the fill level cannot be determined, then this invalid distance value is transmitted to the sensor device by way of the serial interface, as a diagnosis value. The sensor device will thereupon ignore this invalid value and pass the subsequent echo on to the external controller as a valid echo. The invalid echo, particularly a distance value that cannot be evaluated, is transmitted to the controller by way of the serial interface as diagnosis data, to which the controller reacts with an adaptation of the transmission power or of the reception gain, i.e. the external controller accordingly performs a diagnosis, wherein this diagnosis serves to optimize the method for fill level determination.

The fill level is calculated in the external controller on the basis of the distance values that can be evaluated. This fill level value can then be displayed to the user by way of a display, if necessary. It is therefore possible to determine the fill level of the collection container with very slight computation effort and furthermore very precisely, by means of the adaptive filtering of the measurement values obtained by means of the individual measurements.

REFERENCE SYMBOL LIST 1 sensor device
2 collection container
3 chamber
4 ultrasound transducer
5 bottom
6 control module
7 transmission/reception module
8 bidirectional serial interface
9 data memory module
10 controller
11 measurement sequence
12 measurement cycle
13 measurement cycle
14 measurement cycle
15 filling cover
16 filling shaft

The invention claimed is:

1. A method for detection of a fill level in a collection container using a sensor device, wherein the collection container has m detection regions, which are measured by ultrasound, comprising the following steps:

1.0 an initialization takes place for a specific collection container type, which is to be measured, wherein a previously produced profile for this collection container type is made available for the initialization from a data memory module, wherein limit values for the fill level of the collection container type are defined in the profile and general conditions, at least with regard to relative humidity or temperature, are included, and wherein the minimal fill level is defined as the lower limit value, and the maximal fill level is defined as the upper limit value;

1.1 for each of the m detection regions, a measurement cycle (12 to 14) is carried out, wherein m= 1, 2, 3, . . . ;

1.2 in each measurement cycle (12 to 14), n individual measurements are carried out, with n=1, 2, 3 [ . . . ], wherein a transmission power and/or a reception gain and/or a transmission burst is adapted in each of the n individual measurements, thereby causing the individual measurements to differ from one another in the transmission power and/or in the reception gain and/or in the transmission burst;

1.3 a plausibility check is carried out for each measurement cycle, wherein using the plausibility check, the measurement values that were obtained from the n individual measurements of each measurement cycle and can be evaluated are processed further, and invalid measurement values are rejected, wherein data from the profile is taken into consideration as a reference in determining whether a measurement value is invalid.

2. The method according to claim 1, wherein in each individual measurement, an ultrasound transducer of the sensor device emits a signal that is reflected by a content of the collection container and/or by a bottom of the collection container as an echo signal, and wherein the echo signal is converted to an electrical signal by the ultrasound transducer, which signal is transmitted to a control module by the ultrasound transducer.

3. The method according to claim 2, wherein the control module carries out the plausibility check.

4. The method according to claim 3, wherein adaptive filtering is carried out in the control module, in which the measurement values of each measurement cycle that can be evaluated are averages, so that an averaged distance value is obtained for each measurement cycle.

5. The method according to claim 4, wherein the distance values obtained by the adaptive filtering are checked with regard to their stability, wherein distance values that can be evaluated as well as distance values that cannot be evaluated are obtained as a result of the stability check, wherein distance values that can be evaluated are processed further, and distance values that cannot be evaluated are rejected.

6. The method according to claim 5, wherein the distance values that can be evaluated are transmitted to a higher-level controller by way of a bidirectional serial interface, wherein the higher-level controller calculates the fill level of the collection container from the distance values that can be evaluated.

7. The method according to claim 6, wherein the fill level determined is displayed to a user by a display connected with the higher-level controller.

8. The method according to claim 6, wherein the higher-level controller carries out a diagnosis if a distance value that cannot be evaluated is obtained in the sensor device, and wherein the higher-level controller transmits the result of this diagnosis to the bidirectional serial interface as a diagnosis value, wherein this higher-level controller adapts the transmission power and/or the reception gain.

9. Apparatus for detection of a fill level in a collection container using a sensor device, wherein the collection container has m detection regions, which are measured by ultrasound, comprising:

1.0 an initialization device configured to carry out an initialization for a specific collection container type to be measured, wherein a previously produced profile for this collection container type is made available for the initialization from a data memory module, wherein limit values for the fill level of the collection container type are defined in the profile and general conditions, at least with regard to relative humidity or temperature, are included, and wherein the minimal fill level is defined as the lower limit value, and the maximal fill level is defined as the upper limit value;

1.1 a measurement device configured
to carry out a measurement cycle for each of the m detection regions, wherein m=1, 2, 3, . . . ; and
to carry out n individual measurements in each measurement cycle, with n=1, 2, 3 . . . , wherein the measurement device adapts a transmission power and/or a reception gain and/or a transmission burst in each of the n individual measurements, thereby causing the individual measurements to differ from one another in the transmission power and/or in the reception gate gains and/or in the transmission burst, 1.2 a control module configured to carry out a plausibility check for each measurement cycle, wherein using the plausibility check, the measurement values that were obtained from the individual n measurements of each measurement cycle and can be evaluated are processed further, and invalid measurement values are rejected, wherein data from the profile is taken into consideration as a reference in determining whether a measurement value is invalid.

* * * * *